(12) United States Patent
Takase et al.

(10) Patent No.: US 7,048,394 B2
(45) Date of Patent: *May 23, 2006

(54) MECHANISM FOR ADJUSTABLE INSTALLATION OF BAND PLATE-LIKE MEMBER

(75) Inventors: Yoshiyuki Takase, Saitama (JP); Mitsuhiro Ohno, Saitama (JP)

(73) Assignee: Fujinon Corporation (JP)

( * ) Notice: Subject to any disclaimer, the term of this patent is extended or adjusted under 35 U.S.C. 154(b) by 754 days.

This patent is subject to a terminal disclaimer.

(21) Appl. No.: 09/879,012

(22) Filed: Jun. 12, 2001

(65) Prior Publication Data
US 2002/0001408 A1 Jan. 3, 2002

(30) Foreign Application Priority Data
Jun. 13, 2000 (JP) .............................. 2000-176901

(51) Int. Cl.
*G02B 7/182* (2006.01)

(52) U.S. Cl. ...................... 359/872; 248/476; 248/477; 248/479; 248/486

(58) Field of Classification Search ................ 359/214, 359/872; 248/475.1, 476, 477, 479, 486, 248/488, 200.1, 291.1, 292.14, 309.1
See application file for complete search history.

(56) References Cited

U.S. PATENT DOCUMENTS

| 959,099 | A | * | 5/1910 | Anderson | |
|---|---|---|---|---|---|
| 1,628,218 | A | * | 5/1927 | Beauchamp | 359/607 |
| 2,003,806 | A | * | 6/1935 | Lee | 351/244 |
| 3,542,467 | A | * | 11/1970 | Ferguson et al. | 399/201 |
| 3,642,365 | A | * | 2/1972 | Egnaczak et al. | 399/131 |
| 3,998,530 | A | * | 12/1976 | Kaschak | 359/848 |
| 4,186,991 | A | * | 2/1980 | Koide et al. | 359/221 |
| 4,710,017 | A | * | 12/1987 | Watanabe et al. | 399/212 |
| 5,111,342 | A | * | 5/1992 | Quesada | 359/872 |
| 6,585,446 | B1 | | 7/2003 | Kaneko | |
| 6,650,453 | B1 | * | 11/2003 | Takase | 359/198 |

FOREIGN PATENT DOCUMENTS

| JP | 0533108 | 4/1993 |
|---|---|---|
| JP | 06148490 | 5/1994 |

OTHER PUBLICATIONS

Publication No. 2001/0016147 entitled Mechanism for adjustable installation of plate-like member, filed Jan. 24, 2001, inventor Kaneko.

* cited by examiner

Primary Examiner—Ricky D. Shafer
(74) Attorney, Agent, or Firm—Price, Heneveld, Cooper, DeWitt & Litton, LLP

(57) ABSTRACT

A mechanism for adjustable installation of band plate-like members facilitates the separate adjustment of a cylindrical mirror in the normal direction of the reflecting face of the mirror, in a direction intersecting the normal direction, and the orientation of the reflecting face. A mirror holder housing a cylindrical mirror is disposed in a frame. Support shafts of the mirror holder penetrate holder plates attached slidably to the frame. Adjustment plates are linked to the ends of the support shafts from outside the holder plates, which are slid to allow the mirror holder to move in the normal direction of the reflecting surface of the mirror. The adjustment plate is rotated with respect to the holder plate to rotate about the support shafts and slides with respect to the holder plate and moves in a direction different from the normal direction to adjust the magnification, register, and skew of the mirror.

7 Claims, 10 Drawing Sheets

MECHANISM FOR ADJUSTABLE INSTALLATION OF BAND PLATE-LIKE MEMBER

BACKGROUND OF THE INVENTION

1. Field of the Invention

The present invention relates to a mechanism for adjustable installation of a band plate-like member to orient the face of the band plate-like member, such as a reflector, in a predetermined direction. More particularly, the present invention relates to a mechanism for adjustable installation of a band plate-like member, which is suitable for adjusting the orientation of the reflecting face of a reflector used with an optical scanner or a cylindrical mirror for reflecting a beam of light incident upon an image carrier such as a photosensitive drum.

2. Description of the Related Art

An optical scanner used with an image forming apparatus, such as copying machines or printers, is adapted such that a laser beam emitted from a laser source and including image information is dimmed appropriately and impinges upon deflecting means such as a polygon mirror. Then, an image carrier such as a photosensitive drum is radiated with the deflected laser beam to form an electrostatic latent image on the surface thereof. The electrostatic latent image is then developed with toner to form a toner image, which, in turn, is transferred onto a transfer medium such as recording paper to form an image. Also known is a tandem image forming apparatus for a color image forming apparatus such as a color copying machine or a color printer. The reproduction scanning method is performed with laser beams including yellow (Y), magenta (M), cyan (C), and black (BK) image data scanned along a straight line, across a plurality of image carriers such as photosensitive drums, arranged side by side, to form an electrostatic latent image on each of the image carriers. Then, the electrostatic latent image is developed with a predetermined toner to form a toner image, which is in turn transferred successively onto a transfer medium such as recording paper, adapted to move in the direction of the side-by-side arrangement of the image carriers, in order to form a color image. Incidentally, the direction in which a beam of light is deflected with deflecting means such as a polygon mirror to form an electrostatic latent image is defined as the main scan direction, while the direction in which an electrostatic latent image is formed through the rotation of the photosensitive drums acting as image carriers is defined as a sub scan direction.

In recent years, it has been required to provide a plurality of beams of light and scan units for scanning use to introduce color and the higher-speed copying machine or the printers. In order to secure the sharpness of images to be formed, it is necessary to implement the desired optical characteristics of the plurality of scan beams and the desired scan characteristics of the scan unit as well as uniform characteristics of the plurality of units. To implement the optical and scan characteristics, the optical components constituting the optical scanner have to be assembled with high accuracy so that each of the optical components is sustained in place. A slight displacement or a variation in assembly of the reflector in the direction of reflection would cause the optical or scan characteristics to deteriorate. It is therefore necessary to adjust the direction of reflection of the reflector with high accuracy. The reflector for reflecting a scan beam reflected on a polygon mirror is formed in a band plate shape and supported at the both ends to cover the scan area, and a variation in assembly at one end would thus cause the reflecting face to be oriented in a totally different direction. It is therefore necessary to adjust the assembly of the both ends with high accuracy.

For example, conventionally known, as a mechanism of this type for adjusting a reflector is a mechanism for adjusting a mirror, disclosed in Japanese Utility Model Laid-Open Publication No. 1993-33108. This mirror adjustment mechanism is provided at the ends of the mirror frame with support pieces that can abut against the side of the reflecting face of the mirror. The support piece is provided pivotably with an adjustment plate that can abut against the side of the reflecting face of the mirror. In addition, the adjustment plate is provided with an adjustment member for adjusting the pivotal position thereof and an energizing member for pressing against the mirror in contact with the rear side of the mirror frame. Then, when the adjustment member is adjusted to allow the adjustment plate to pivot, the mirror swings about the longitudinal direction as its axis to cause the reflecting face to be oriented in a different direction.

On the other hand, disclosed in Japanese Patent Laid-Open Publication No. 1994-148490 is a mechanism for holding the optical member of a beam scan optical system. This mechanism for holding the optical member employs the following configuration. That is, provided are holes having small projections on the side plate of the housing such as of an optical apparatus. Both ends of a plane mirror are fitted loosely into these holes. A presser plate is fixedly screwed from outside onto the side plate but made pivotable about a fulcrum that is different from the fixing screw. A presser piece provided on the presser plate is brought into contact with the rear side of the mirror. The presser plate is pivoted to adjust the angle of inclination of the mirror and then fixed to the side plate with a fixing screw. A long hole formed on the presser plate and an eccentric pin are combined with each other to allow the eccentric pin to pivot, thereby pivoting the presser plate.

In some cases, a reflector is provided at the final stage, for guiding a beam of light to the image carrier of the optical scanner, which is provided with a long cylindrical mirror having a cylindrical surface in order to adjust the mirror so that the beam of light is incident on the surface of the image carrier under a predetermined magnification. In this cylindrical mirror, its displacement in the normal direction causes a variation in magnification on the surface of the image carrier. Furthermore, pivotal movement of the mirror about the direction parallel to the center of its curvature as its axis causes a variation in the position of incidence of the beam on the image carrier. A shift in relative position between both ends of the mirror causes the position of the scan line to vary in the main scan direction. Accordingly, in the cylindrical mirror, it is necessary to adjust its position in the normal direction (hereinafter referred to as the "magnification adjustment"), the pivotal angle to thereby adjust the position of incidence (hereinafter referred to as the "register adjustment"), and the relative position between both ends (hereinafter referred to as the "skew adjustment"). This mechanism for adjustable installation of the cylindrical mirror also employs the aforementioned conventional mirror adjustment mechanism and the mechanism for holding optical members.

On the other hand, the mechanism for adjusting a mirror, disclosed in Japanese Utility Model Laid-Open Publication No. 1993-33108, allows the adjustment plate in direct contact with the mirror to pivot. Since this adjustment plate is provided at either one end or both ends of the mirror, it is possible to cause strain such as twist or bend to occur in the mirror depending on the method of the adjustment. That is, the mechanism having an adjustment plate disposed at the one end of the mirror allows the other end to be restrained by a predetermined force. Accordingly, when the adjustment plate is pivoted to movably push the one end, the mirror will be possibly bent or twisted. On the other hand, the mechanism provided with the adjustment plate on both ends requires adjustment at both ends of the mirror. This will make the adjustment irksome and the strain of the mirror cannot be securely prevented unless the mirror is adjusted evenly at both ends.

A mechanism for holding optical members is disclosed in Japanese Patent Laid-Open Publication No. 1994-148490 and allows the presser plate, acting as a plate spring and pushing resiliently on the rear side of the mirror, to be in contact with both ends of the mirror. Accordingly, like said mirror adjustment mechanism, the presser plate pressed against the one end is adjusted to thereby cause the mirror to be bent or twisted by the force of the adjustment, thus causing strain to occur.

SUMMARY OF THE INVENTION

It is therefore a first object of the present invention to provide a mechanism for adjustable installation of a band plate-like member which allows band-shaped optical members such as a mirror or lens to be assembled without causing any strain to occur in the optical members and to be provided with improved accuracy of assembly for adjustment such as in the direction of reflection.

In addition, as described above, adjusted in a complicated manner are those that employ the conventional mirror adjustment mechanism or the mechanism for holding optical members for mounting and adjusting the cylindrical mirror. For example, such a configuration is employed in which a bracket for slidably mounting the mirror is provided and thereby the magnification is adjusted, allowing the register and skew adjustment to be carried out by the pivotal movement of the adjustment plate or the presser plate. For this reason, when the adjustment plate or the presser plate is pivoted to adjust the skew after the register has been adjusted, the position of the register that has been adjusted will not stay in adjustment to thereby make it necessary to adjust the register again. That is, while the register and the skew are being alternately adjusted, a predetermined optical performance has to be reached. Thus, this makes the adjustment troublesome and it would take a considerably long time for an unskilled person to perform the adjustment.

It is therefore a second object of the present invention to provide a mechanism for adjustable installation of a plate like-members which can adjust easily and securely even such an optical member, particularly like a cylindrical mirror, that has to be moved in a plurality of directions to be mounted and adjusted.

As technical means for achieving said objects, the present invention provides the mechanism for adjustable installation of the plate like-member for adjusting the orientation of a surface of a band plate-like member supported at both ends thereof. The mechanism is characterized in that said band plate-like member is housed in a container having at least one opening on a side so as to allow a surface of said band plate-like member to be exposed from the opening, and support shafts linkable to the adjustable mechanism are provided on both ends of said container.

Changing the position of said container by said adjustable mechanism would allow the orientation of the surface of the band plate-like member to be changed. Furthermore, since the band plate-like member is housed in the container, the adjustment force applied for adjusting the position of the container is not applied to the band plate-like member, thereby preventing strain to be generated in the band plate-like member.

In addition, according to a second aspect, the present invention provides an adjustable installation of a band plate-like member for adjusting the orientation of a surface of a band plate-like member supported at both ends thereof. The mechanism is characterized in that the both ends of said band plate-like member are housed in respective separate holders, and support shafts linkable to the adjustable mechanism are provided on said holders.

Since said band plate-like member is housed in said holder linked to the adjustable mechanism at both ends thereof, the force for adjusting the position is not directly applied to the band plate-like member, thereby making it possible to prevent strain from being generated in the band plate-like member as much as possible.

In addition, according to a third aspect, the present invention provides a mechanism for adjustable installation of a band plate-like member. The mechanism is characterized in that said support shafts are extended in a longitudinal direction of the band plate-like member, and each of said support shaft is loosely fitted into a through hole formed on a holder plate so as to allow the support shaft to be freely decentered within the through hole. The mechanism is also characterized in that an adjustment plate is linked to a portion projecting outwardly from said holder plate of said support shaft, and said adjustment plate is moved relative to the holder plate to thereby make said support shaft movable in a direction intersecting the support shaft as well as said adjustment plate is rotated relative to the holder plate to thereby make said band plate-like member rotatable about the support shaft.

When said adjustment plate is moved relative to said holder plate, said support shaft is decentered within said through hole of the holder plate. Since the container and holder having this support shaft houses the band plate-like member, the support shaft is decentered to thereby change the position of the band plate-like member. Furthermore, the rotation of the adjustment plate about the support shaft causes the orientation of the surface of the band plate-like member to be changed.

According to a fourth aspect, the present invention provides a mechanism for adjustable installation of a band plate-like member, characterized in that said band plate-like member has a flat surface. For example, when the band plate-like member is a plane mirror, the position of incidence on the reflecting face or the direction of reflection can be adjusted.

According to a fifth aspect, the present invention provides a mechanism for adjustable installation of a band plate-like member, characterized in that said support shaft is moved to thereby make said band plate-like member movable in a direction of thickness of said band plate-like member. When the band plate-like member is a plane mirror, the mirror can be moved in the direction of thickness, thereby making it possible to move the reflecting face back and forth along the optical path and thus adjust the optical path length. Furthermore, rotation of the mirror about the support shaft allows the direction of reflection to be adjusted.

According to a sixth aspect, the present invention provides a mechanism for adjustable installation of a band plate-like member, characterized in that said support shaft is moved to thereby make said band plate-like member movable in a direction of width of said band plate-like member. When the band plate-like member is a plane mirror and the mirror lies outside the optical path of an incident beam of light, the mirror can be moved in the direction of width so as to be located in the optical path, allowing the light to be incident on the optical path.

According to a seventh aspect, the present invention provides a mechanism for adjustable installation of a band plate-like member, characterized in that said band plate-like member has a cylindrical surface. For example, when the band plate-like member is a cylindrical mirror, the position of incidence on the reflecting face or the direction of reflection can be adjusted.

According to an eighth aspect, the present invention provides a mechanism for adjustable installation of a band plate-like member, characterized in that said support shaft is moved to thereby make said band plate-like member movable in a direction of normal of a surface of said band plate-like member. When the band plate-like member is a cylindrical mirror, movement of the mirror in the normal direction makes it possible to perform the magnification adjustment. Incidentally, rotation about the support shaft will make it possible to change the direction of reflection, allowing the register adjustment to be performed.

According to a ninth aspect, the present invention provides a mechanism for adjustable installation of a band plate-like member, characterized in that said support shaft is moved to thereby make said band plate-like member movable in a direction intersecting a normal of a surface of said band plate-like member. When the band plate-like member is a cylindrical mirror, the mirror can be moved in the direction intersecting the normal direction to thereby change the relative position between both ends of the cylindrical mirror, allowing the skew adjustment to be performed.

According to a tenth aspect, the present invention provides a mechanism for adjustable installation of a cylindrical mirror for adjusting the orientation of a surface of a band plate-like member being a long cylindrical mirror, the cylindrical mirror being provided on a desired frame and supported at both ends thereof. The mechanism is characterized by comprising a mirror container, having at least one opening on a surface, for housing said cylindrical mirror to allow a reflecting face of the cylindrical mirror to be exposed from the opening, and support shafts extending in a longitudinal direction of the cylindrical mirror and provided on both ends of said mirror container. The mechanism is also characterized by comprising holder plates loosely fitted onto said respective support shafts, and an adjustment plate linked to a portion projecting outwardly from said holder plate of said support shaft. The mechanism is further characterized in that said holder plate is made slidable in a direction intersecting said support shaft with respect to a surface of said frame for arranging the cylindrical mirror thereon, said adjustment plate is made slidable in a direction intersecting a sliding direction of the holder plate with respect to the holder plate, and said mirror container is made rotatable about the support shaft.

When said holder plate is slid with respect to said frame, the mirror container moves in the same direction since the support shaft is loosely fitted into the holder plate. The movement of the mirror container can move the cylindrical mirror in one direction. Furthermore, movement of said adjustment plate would cause the cylindrical mirror to move since the support shaft is linked to the adjustment plate. However, the movement takes place in another direction intersecting the one direction. That is, the cylindrical mirror can be moved in two directions, thereby making it possible to perform the magnification and skew adjustment of the reflecting face. In addition, rotation of the mirror about the support shaft will make it possible to change the direction of reflection, thereby allowing the register adjustment to be performed.

According to an eleventh aspect, the present invention provides a mechanism for adjustable installation of a cylindrical mirror, characterized in that any one of said holder plates is appropriately clearance-fitted onto a support shaft to serve as a restraint holder plate, and the other holder plate is appropriately loosely fitted onto a support shaft to allow the support shaft to be freely decentered and is thereby allowed to serve as a loose-fit holder plate. The mechanism is also characterized in that said adjustment plate located outside said restraint holder plate is employed as an engagement adjustment plate for engaging and disengaging the support shaft, and said engagement adjustment plate is rotated with respect to the restraint holder plate to thereby allow the mirror container to rotate about the support shaft. The mechanism is further characterized in that both of said holder plates are made slidable with respect to said frame in a normal direction of a cylindrical mirror, said adjustment plate located outside said loose-fit holder plate is employed as an operation adjustment plate, and said operation adjustment plate is made slidable with respect to the loose-fit holder plate in a direction intersecting the normal direction of the cylindrical mirror.

When said holder plate is moved with respect to the frame, the cylindrical mirror is moved in the normal direction, thereby allowing the magnification adjustment to be performed. The movement of said operation adjustment plate relative to said loose-fit holder plate causes the support shaft linked to the operation adjustment plate to move and change the position relative to the support shaft linked to said engagement adjustment plate. This causes the relative position between both ends of the cylindrical mirror to be changed, thereby allowing the skew adjustment to be performed. Furthermore, the rotation of said engagement adjustment plate about the restraint holder plate would cause the mirror container to rotate about the support shaft. This makes it possible to change the orientation of the reflecting face of the cylindrical mirror, thereby allowing the register adjustment to be performed.

According to twelfth aspect, the present invention provides a mechanism for adjustable installation of a cylindrical mirror, characterized in that any one of said holder plates is appropriately clearance-fitted onto a support shaft to serve as a restraint holder plate, and the other holder plate is appropriately loosely fitted onto a support shaft to allow the support shaft to be freely decentered and is thereby allowed to serve as a loose-fit holder plate. The mechanism is also characterized in that said adjustment plate located outside said restraint holder plate is employed as an engagement adjustment plate for engaging and disengaging the support shaft, and said engagement adjustment plate is rotated with respect to the restraint holder plate to thereby allow the mirror container to rotate about the support shaft. The mechanism is further characterized in that both of said holder plates are made slidable with respect to said frame in a direction of an incident beam of light to a cylindrical mirror, said adjustment plate located outside said loose-fit holder plate is employed as an operation adjustment plate, and said operation adjustment plate is made slidable with respect to the loosefit bolder plate in a direction intersecting a normal direction of the cylindrical mirror.

When the holder plate is adapted to slide in the normal direction of the reflecting face of the cylindrical mirror, the portions for guiding the sliding of the holder plate can be made constant since the sliding has nothing to do with the direction of incidence of light on the cylindrical mirror. This is preferable because the holder plates can be formed in the same shape for use with a plurality of cylindrical mirrors having different directions of incidence. On the other hand, when the holder plate is adapted to slide in the normal direction, the position of incidence is shifted before and after the sliding. Thus, after the sliding, the incident beam of light would possibly fall outside the cylindrical mirror. Accordingly, the incident beam of light can be prevented from falling outside the cylindrical mirror by making the cylindrical mirror slidable in the direction of incidence specified by the design of the optical path.

According to a thirteenth aspect, the present invention provides a mechanism for adjustable installation of a cylindrical mirror, characterized in that said restraint holder plate and said loose-fit holder plate are molded in the same shape and said support shafts are provided with different outer diameters, and the support shaft for engaging and disengaging said engagement adjustment plate is provided with engagement means for preventing said engagement adjustment plate from being released.

The restraint holder plate and the loose-fit holder plate can be formed in the same shape, thereby facilitating the machining and the management of the parts. Furthermore, after a predetermined adjustment, said engagement means prevent the engagement adjustment plate from releasing from the support shaft. This prevents the engagement adjustment plate from being accidentally released, thereby making it possible to maintain the cylindrical mirror under the adjusted condition.

DETAILED DESCRIPTION OF THE EMBODIMENTS

A mechanism for the adjustable installation of a band plate-like member according to the present invention will be specifically explained below with reference to the accompanying drawings in accordance with the preferred embodiments. Incidentally, explanations will be made on the embodiments in which a mounting and adjusting mechanism employs a cylindrical mirror used in an optical scanner as a band plate-like member to adjust the magnification, register, and skew of the mirror.

Figure 5:
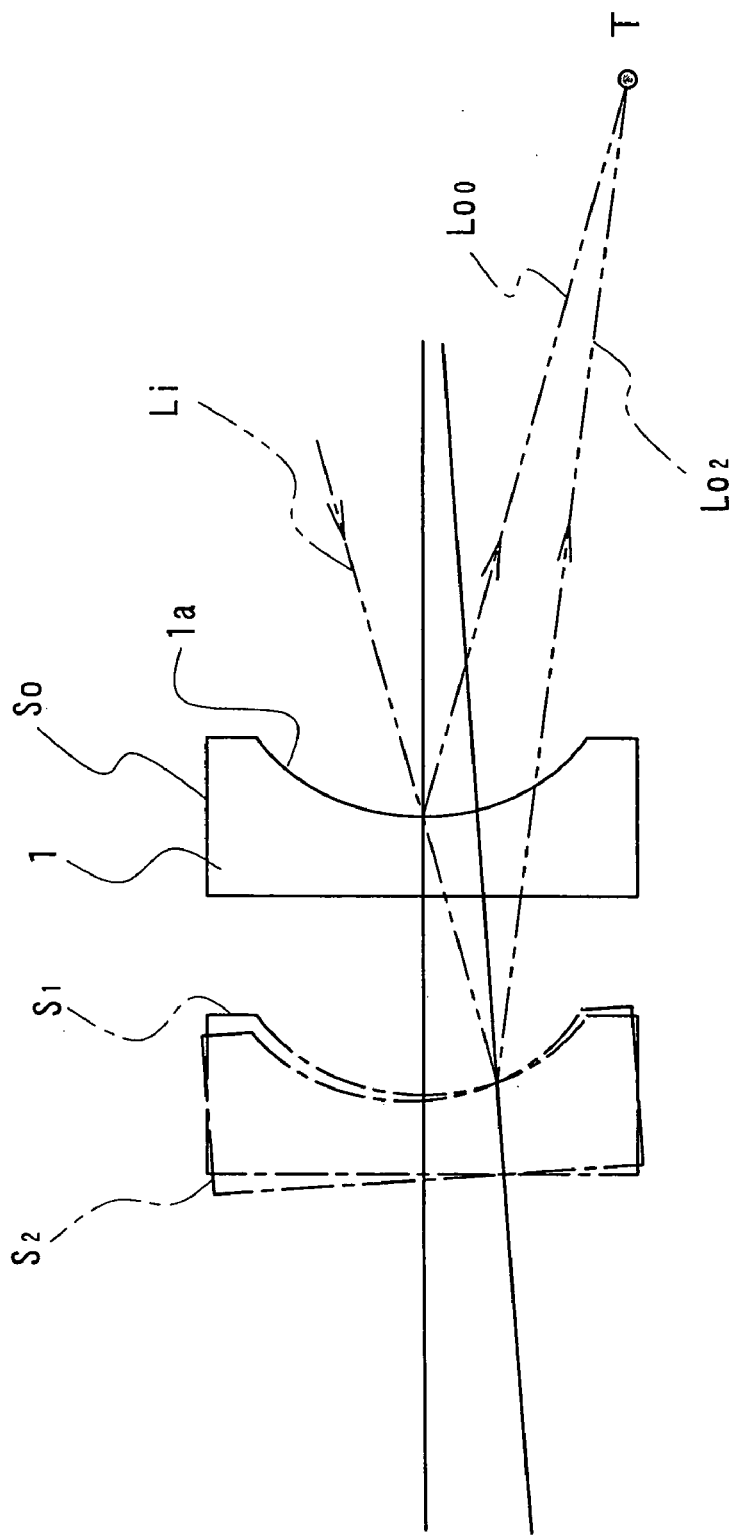
FIG. 5 is an explanatory view illustrating the relationship between a beam of light incident on the cylindrical mirror and a beam of light reflected thereon, shown before and after the sliding movement of the cylindrical mirror.
Figure 7:
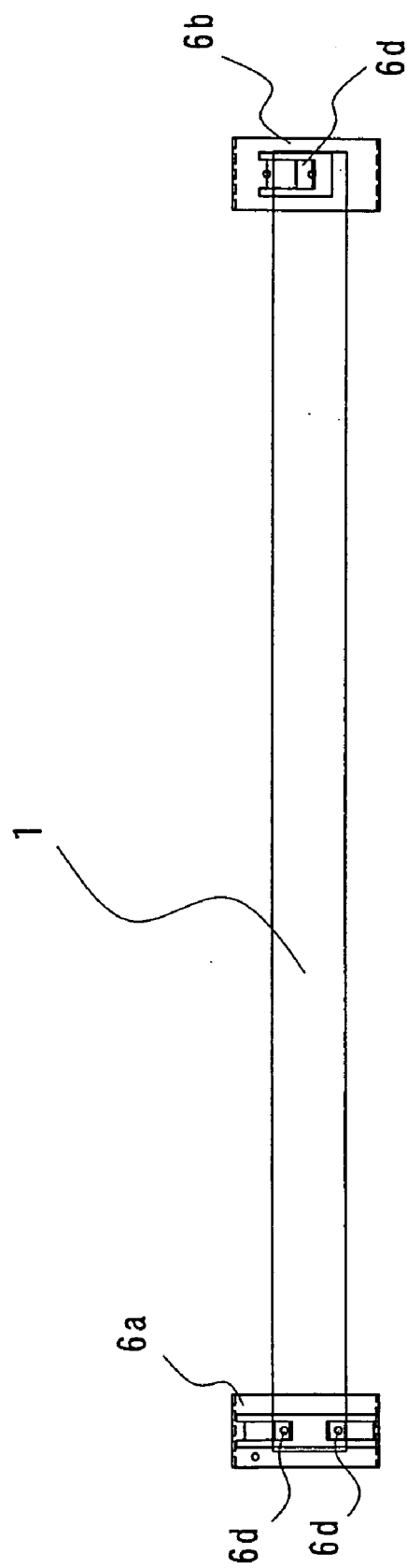
FIG. 7 a plan view illustrating a cylindrical mirror acting as a band plate-like member to be mounted and adjusted by the mechanism for adjustable installation according to the present invention.
Figure 8:
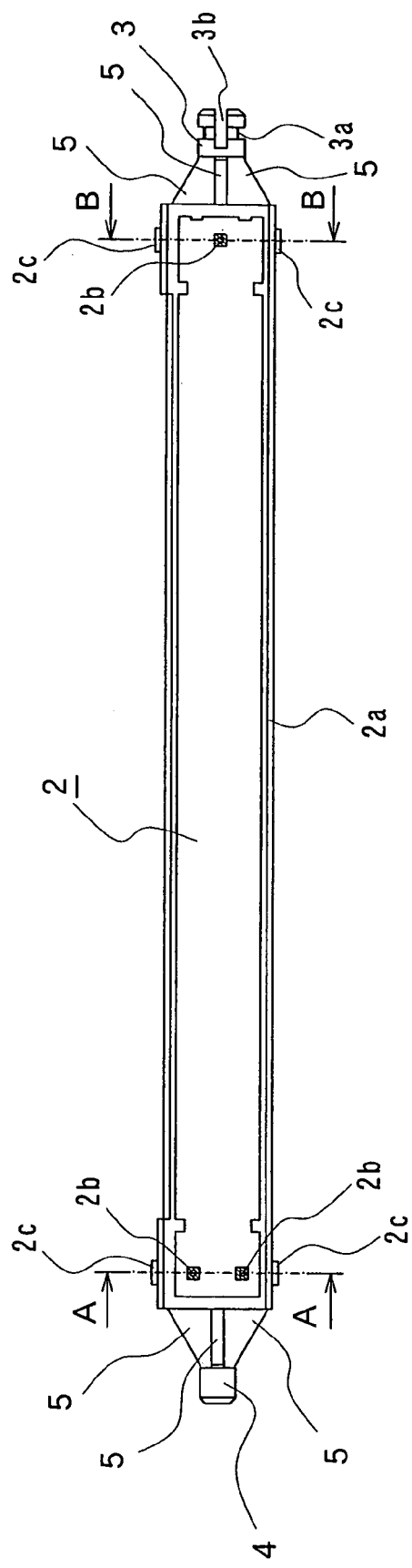
FIG. 8 is a plan view illustrating a container for housing a band plate-like member to be mounted and adjusted by the mechanism for adjustable installation according to the present invention.
Figure 9:
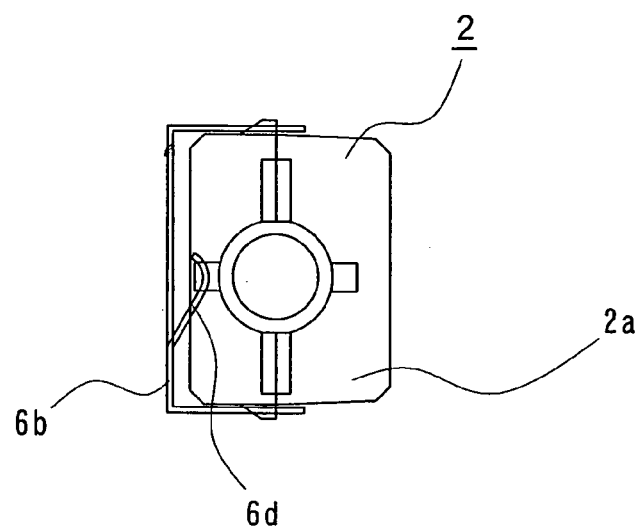
FIG. 9 is a right-hand side view illustrating the container shown in FIG. 8.
Figure 10:
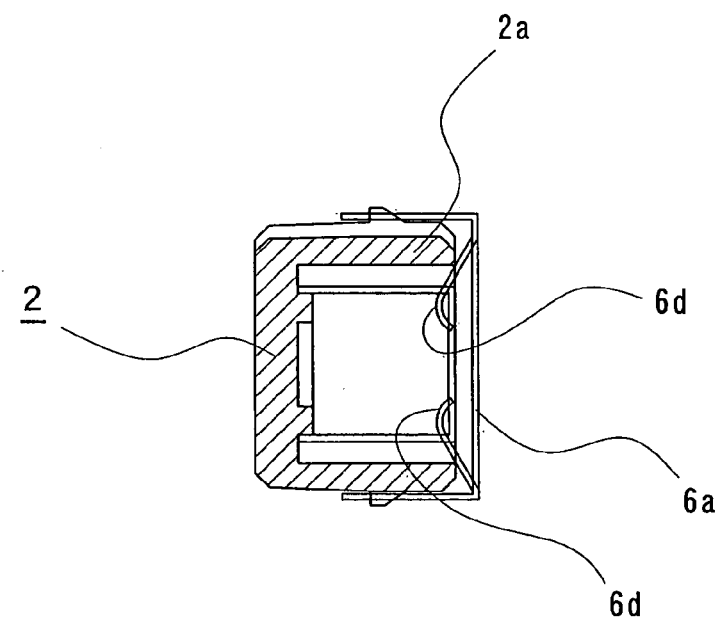
FIG. 10 is a cross-sectional view taken along line A—A of FIG. 8.
Figure 11:
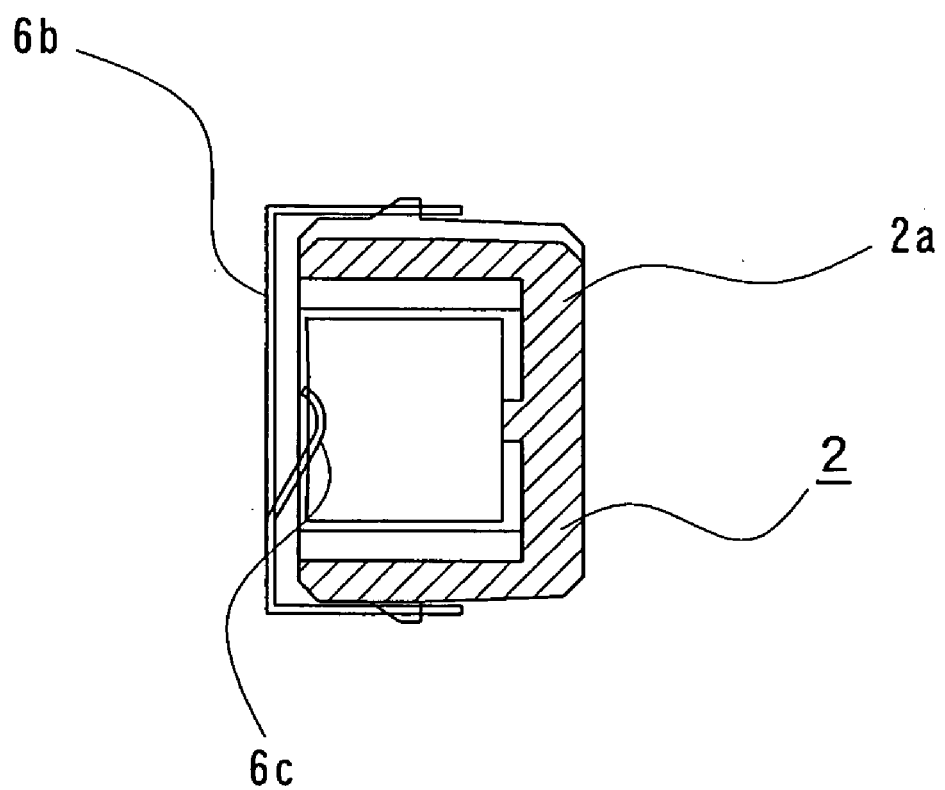
FIG. 11 is a cross-sectional view taken along line B—B of FIG. 8.

As shown in FIG. 7, a cylindrical mirror 1 is formed in a long band plate shape and the longitudinal direction thereof is employed as the main scanning direction for performing reproduction scanning of the optical scanner. As shown in FIG. 5, a surface 1a of the cylindrical mirror 1 is formed into a cylindrical surface at the central portion related to scanning and generally into a plane at both ends. As shown in FIGS. 8 to 12, the cylindrical mirror 1 is housed in a mirror holder 2 acting as a mirror container. As shown in FIGS. 10 and 11, the mirror holder 2 is provided with a holder portion 2a, which is formed in the shape of a box generally rectangular in cross section, which is substantially as long as the cylindrical mirror 1, and which has an opening on one face in the longitudinal direction. As shown in FIG. 8, at both ends of the bottom plate of the holder portion 2a, there are formed mirror receiver portions 2b of small projections. The mirror receiver portions 2b, two being formed at one end and one at the other end, are adapted to be in contact at the three points with the reverse side of the cylindrical mirror 1. In addition, on the outer surface at the ends of the sidewall of the holder portion 2a, there are provided spring engagement portions 2c (FIGS. 1, 2, and 8) made up of an appropriate projection.

Figure 12:
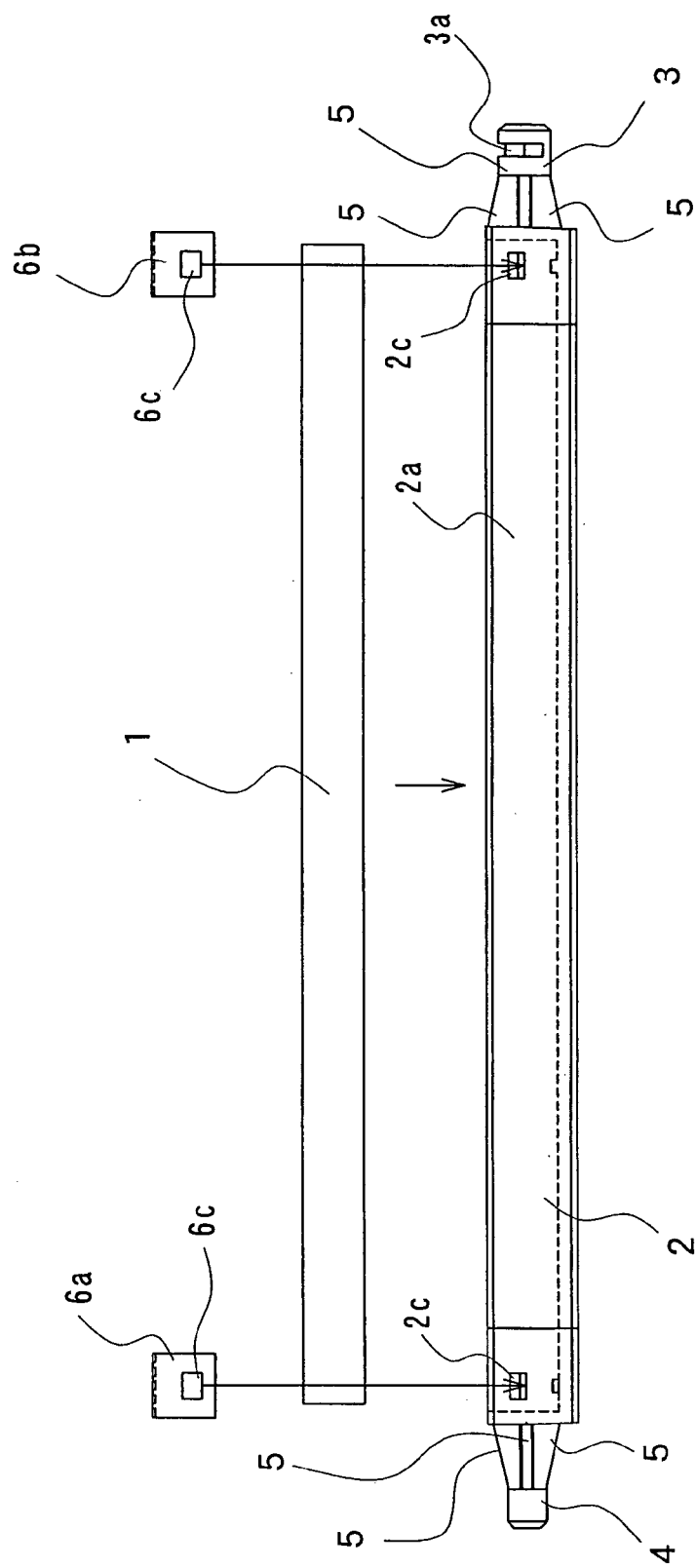
FIG. 12 is an exploded view illustrating the procedure for housing a cylindrical mirror in the container shown in FIG. 8.

As best seen in FIG. 8, on the respective ends of the holder portion 2a, there are provided support shafts 3, 4, with the support shaft 3 being larger in outer diameter than the support shaft 4. Furthermore, as shown in FIGS. 8 and 12, at the central portion of the support shaft 3, there is formed an engagement portion 3a having three flat surfaces. Moreover, as shown in FIG. 8, at the tip of the support shaft 3, there is formed a notch 3b having an appropriate depth in the axial direction thereof and constituting engagement means. The mirror holder 2 allows the holder portion 2a and the support shafts 3, 4 to be integrally molded of a synthetic resin. At the connections between the holder portion 2a and the support shafts 3, 4, there are provided appropriate reinforcing ribs 5.

The cylindrical mirror 1 is housed in the holder portion 2a of the mirror holder 2 with the reflecting face of the cylindrical mirror 1 being exposed to the opening of the holder portion 2a. At both ends of the cylindrical mirror 1 housed in the holder portion 2a, there are provided mirror retainer springs 6a, 6b, respectively, FIGS. 9 and 12). The mirror retainer springs 6a, 6b are a plate material bent in the shape of a Japanese Katakana character "コ", at the legs of which formed are through holes 6c generally rectangular in shape as shown in FIG. 12. In addition, at the core portion of the character "コ", there are formed notches in part, and portions surrounded by the notches are bent appropriately to form spring retainer projections 6*d* that project into the character "□". The spring retainer projection 6*d* is formed at two places on the mirror retainer spring 6*a* and at one place on the mirror retainer spring 6*b*. As shown in FIG. 12, these mirror retainer springs 6*a*, 6*b* are allowed to cover the cylindrical mirror 1 housed in the holder portion 2*a*. At this time, said through holes 6*c* of the mirror retainer springs 6*a*, 6*b* engage said spring engagement portions 2*c* to prevent the mirror retainer springs 6*a*, 6*b* from being released. In addition, the spring retainer projections 6*d* (FIG. 9) are brought into contact with the flat surfaces at both ends of the cylindrical mirror 1, allowing the cylindrical mirror 1 to be retained at three points. Incidentally, appropriate recessed portions may be formed as a spring contact portion at the portion of the cylindrical mirror 1 with which the spring retainer projections 6*d* are in contact. Furthermore, the mirror retainer spring 6*a* having the spring retainer projections 6*d* formed at two places is attached to the end where said mirror receiver portions 2*b* are formed at two places. On the other hand, the mirror retainer spring 6*b* having the spring retainer projection 6*d* formed at one place is attached to the end where said mirror receiver portion 2*b* is formed at one place.

Figure 3:
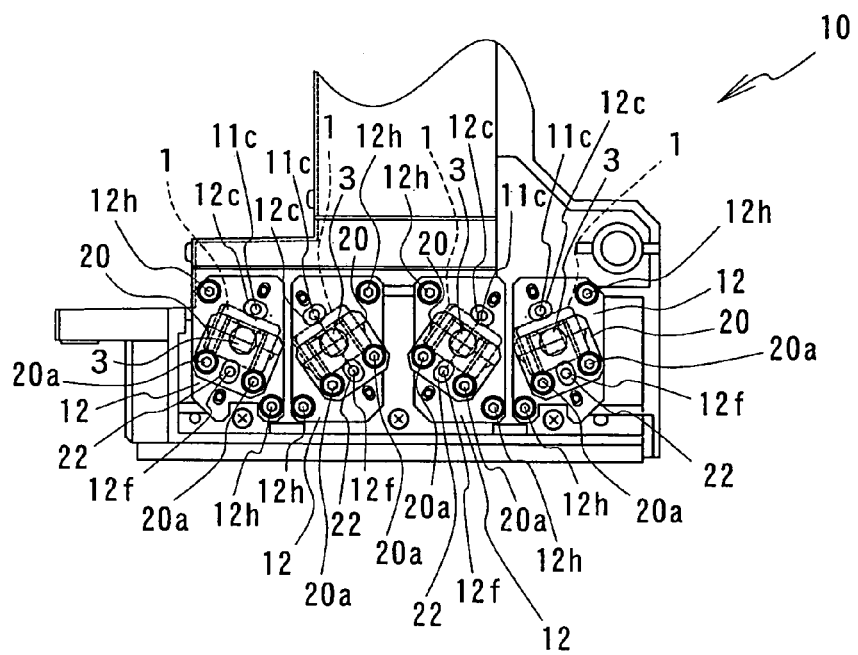
FIG. 3 is a side view illustrating a cylindrical mirror mounted to an optical scanner by means of a mounting structure comprising the adjustable mechanism, viewed from one direction.
Figure 4:
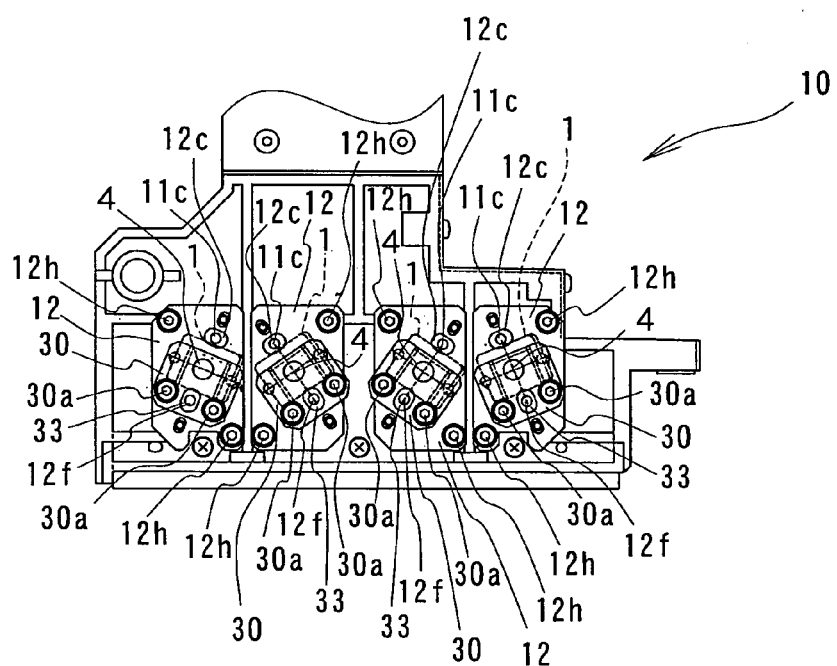
FIG. 4 is a side view illustrating the cylindrical mirror mounted to the optical scanner by means of the mounting structure comprising the adjustable mechanism, viewed from another direction.

The cylindrical mirror 1 housed in said mirror holder 2 is disposed in place in an optical scanner 10. FIGS. 3 and 4 are side views illustrating a portion of the optical scanner 10, to which the cylindrical mirror 1 is attached, the optical scanner 10 being provided with four cylindrical mirrors 1.

Figure 1:
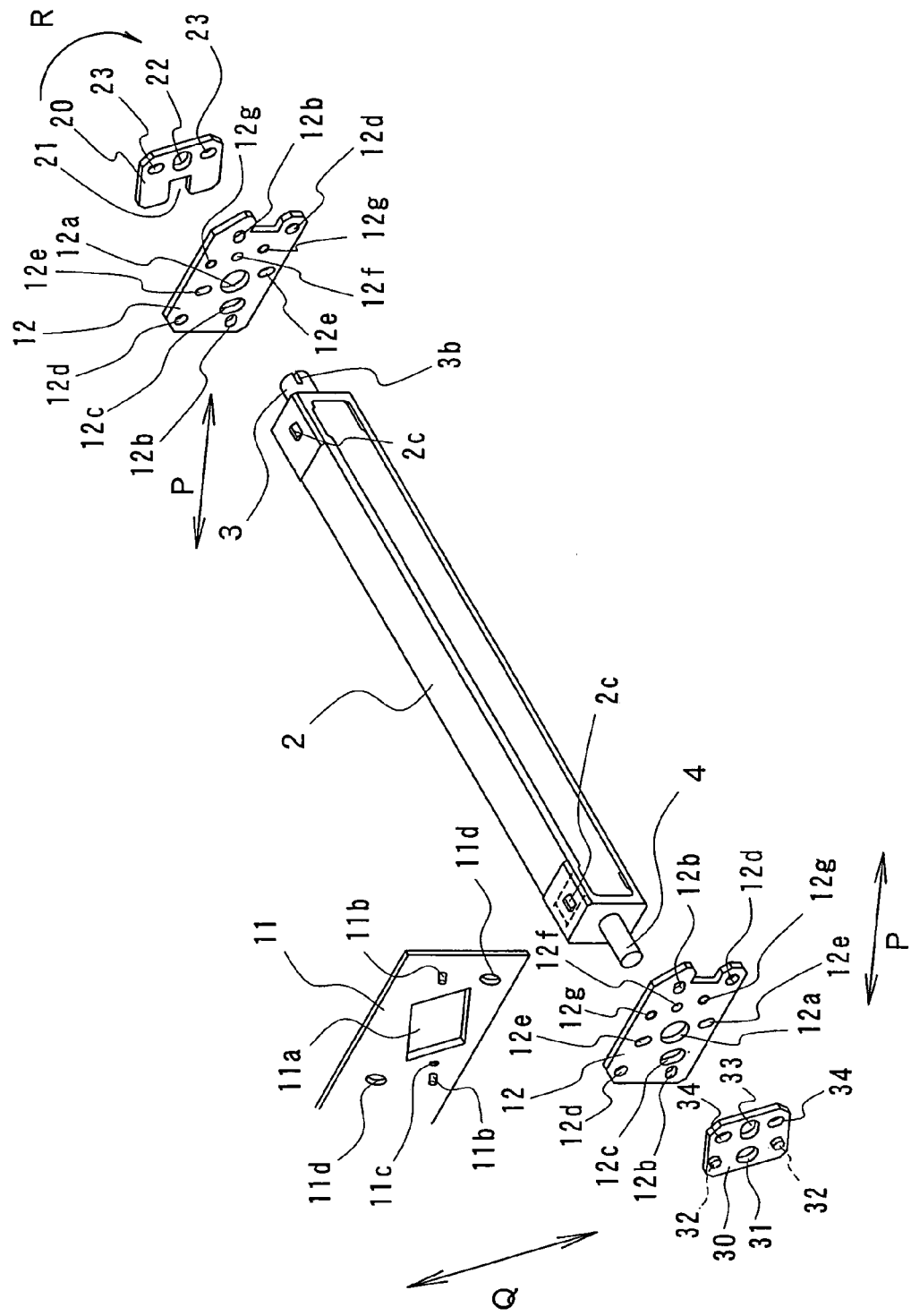
FIG. 1 is a schematic perspective view illustrating the configuration of the mechanism for adjustable installation according to the present invention, viewed from one direction.

FIG. 1 is an exploded schematic perspective view illustrating the cylindrical mirror 1 being attached to the optical scanner 10. A frame 11 is provided on the portion to which the cylindrical mirror 1 of the optical scanner 10 is attached. As shown in FIGS. 3 and 4, the sidewall of the casing of the optical scanner 10 itself can be used as the frame 11. Although the frame 11 is shown only on the side of the support shaft 4 in FIG. 1, the same frame 11 is also provided on the side of the support shaft 3. The frame 11 is provided with an insert hole 11*a* that allows the mirror holder 2 to be inserted therein. At the positions across the insert hole 11*a* and functioning as described later, there are provided a pair of guide projections 11*b* in a protruding manner, with a guide hole 11*c* being formed at an appropriate position on the straight line connecting between these guide projections 11*b*. In addition, there are formed a pair of threaded apertures 11*d* at an appropriate position across the insert hole 11*a*.

With the mirror holder 2 being placed in between the frames 11 through said insert holes 11*a*, the support shafts 3, 4 of the mirror holder 2 protrude outside the frames 11. Holder plates 12 are fitted onto said support shafts 3, 4 from outside the frame 11.

The aforementioned holder plates 12, fitted onto any one of the support shafts 3, 4, are formed such as of a metal sheet to be equal to each other in shape. At the center of the holder plate 12, there is formed a support hole 12*a* to be fitted onto the support shafts 3, 4. The support hole 12*a* has an inner diameter that allows clearance-fit thereof onto the support shaft 3 and the support shaft 3 to be guided rotatably through the support hole 12*a*. In addition, the support shaft 4 is less in diameter than the support shaft 3, and therefore the support shaft 4 is adapted to move within the support hole 12*a* to allow the support shaft 4 to be decentered freely with respect to the support hole 12*a*. The holder plates 12 to be fitted onto the support shaft 3 is employed as a restraint holder plate, while the holder plates 12 to be fitted onto the support shaft 4 is employed as a loose-fit holder plate.

On the holder plates 12, there are formed a pair of long holes 12*b* (FIGS. 1 and 2) that allow said guide projections 11*b* to be loosely inserted therein. The long holes 12*b* are adapted to loosely fit onto the guide projections 11*b* with the holder plates 12 being fitted onto the support shafts 3, 4. The long hole 12*b* has its longitudinal direction along the line connecting between the two guide projections 11*b*, thereby making the holder plates 12 slidable along the straight line connecting between the guide projections 11*b*. In addition, with the holder plate 12 being in contact with the frame 11, at a portion of the holder plate 12 corresponding to said guide hole 11*c*, there is formed a positioning hole 12*c* or a long hole having its longitudinal direction generally orthogonal to the line connecting between the long holes 12*b*. The positioning hole 12*c* has a diameter appropriately larger than the inner diameter of said guide hole 11*c*. Incidentally, the straight line connecting between the guide projections 11*b* is adapted to pass through the center of the support hole 12*a*. This allows the centers of the support hole 12*a*, the long holes 12*b*, and the positioning hole 12*c* to lie generally on the same line. In addition, with the holder plate 12 being in contact with the frame 11, at the portions of the holder plate 12 corresponding to said threaded apertures 11*d*, there are formed penetration holes 12*d* having an inner diameter appropriately smaller than the nominal diameter of the threaded apertures 11*d*.

On the holder plates 12, there are also formed a pair of long holes 12*e* in the direction generally orthogonal to the straight line connecting between said long holes 12*b*. The long holes 12*e* are disposed on the straight line in the radial direction of and across the support hole 12*a*, and have a longitudinal direction in the radial direction thereof. There is also formed a guide hole 12*f*, generally opposite to said positioning hole 12*c* across the support hole 12*a*, on the straight line connecting between said long holes 12*b*. In the radial direction of the guide hole 12*f*, there are formed a pair of threaded apertures 12*g* across the guide hole 12*f* on the straight line orthogonal to the straight line connecting between the long holes 12*b*.

The tip of said support shaft 3 projects outwardly from the restraint holder plate 12, and an engagement adjustment plate 20 is attached to the projected tip. On the other hand, the tip of said support shaft 4 projects outwardly from the loose-fit holder plate 12, and an operation adjustment plate 30 is fitted onto the projected tip.

Figure 2:
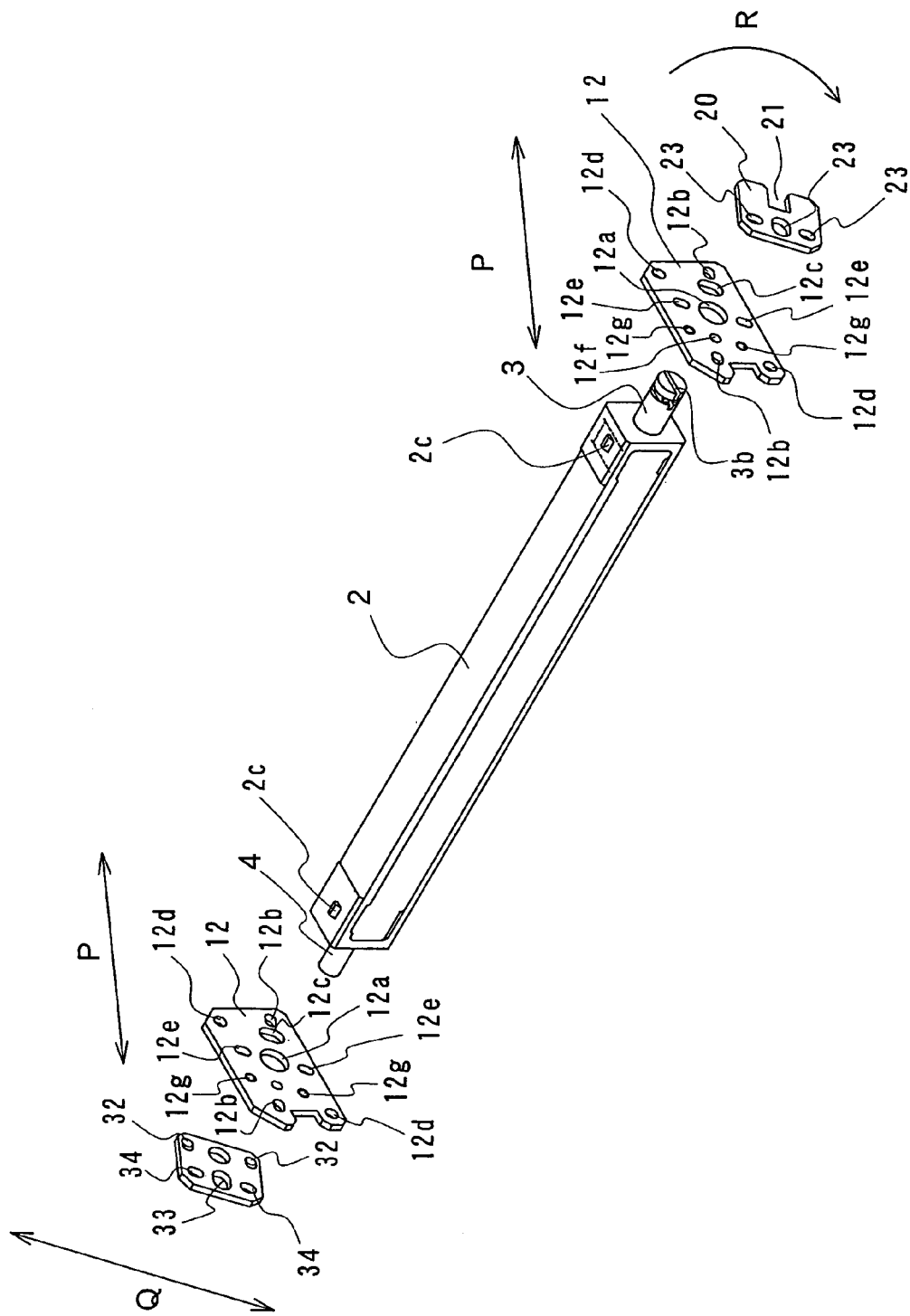
FIG. 2 is a schematic perspective view illustrating the configuration of the mechanism for adjustable installation shown in FIG. 1, viewed from another direction.

As shown in FIGS. 1 and 2, the engagement adjustment plate 20 is formed of a metal sheet or the like, and has a notched portion 21 generally at the center of the rectangle. The notched portion 21 is formed generally in the shape of a rectangle with the distance between its two parallel faces being generally equal to that between the two parallel faces of said engagement portion 3*a* of the support shaft 3. With the engagement portion 3*a* being engageably inserted into the notched portion 21 to allow the notched portion 21 to engage the engagement portion 3*a*, turning around the engagement adjustment plate 20 would cause the support shaft 3 and thereby the mirror holder 2 to pivot. On an extension of the center line passing through the center of the width of the notched portion 21, there is formed a long hole 22 having a longitudinal direction in the direction of said center line, at the position corresponding to said guide hole 12*f* of the holder plate 12 with the notched portion 21 engaging the engagement portion 3*a*. The width of the long hole 22 is appropriately larger than the inner diameter of the guide hole 12*f*. In addition, there are formed stopper long holes 23 having the direction of the width of the long hole 22 as a longitudinal direction, at the positions corresponding to said threaded apertures 12g of the holder plate 12 with the notched portion 21 engaging the engagement portion 3a.

The aforementioned operation adjustment plate 30 is formed of a metal sheet or the like generally in the shape of a rectangle and provided with a receiver hole 31 to be clearance-fitted onto said support shaft 4. This makes the operation adjustment plate 30 pivotable about the support shaft 4. In a protruding manner, there are provided guide projections 32, to be loosely fitted into the long holes 12e, at the position corresponding to said long holes 12e of the loose-fit holder plate 12 with the receiver hole 31 engaging the support shaft 4. In addition, there is formed a long hole 33 having a longitudinal direction in the direction orthogonal to the straight line connecting between said guide projections 32, at the position corresponding to said guide hole 12f of the loose-fit holder plate 12 with the receiver hole 31 being fitted onto the support shaft 4. Furthermore, at the positions corresponding to said threaded apertures 12g, there are formed stopper long holes 34 having the direction of the width of said long hole 33 as a longitudinal direction.

With the engagement adjustment plate 20 being superimposed on the operation adjustment plate 30, it is possible to align said long hole 22 with the long hole 33, said stopper long holes 23 with the stopper long holes 34, and the width of said notched portion 21 with the inner diameter of said receiver hole 31. That is, the engagement adjustment plate 20 and the operation adjustment plate 30, the long holes 22, 33, and the stopper long holes 23, 34 can be formed in the same shape, respectively. The notched portion 21 can be machined upon machining the engagement adjustment plate 20, and the guide projections 32 can be machined upon machining the operation adjustment plate 30. This allows part of manufacturing process to be employed in common.

The action of the mechanism for adjustable installation of a cylindrical mirror according to the embodiment of the present invention, configured as described above, will be explained below.

The cylindrical mirror 1 housed in the mirror holder 2 is held with stability since said mirror retainer springs 6a, 6b and the spring retainer projection 6d press against the cylindrical mirror 1 at three points. Suppose that the mirror holder 2 is inserted from the insert hole 11a of the frame 11 to allow the support shafts 3, 4 to project from the frame 11. At this time, the orientation of the reflecting face of the cylindrical mirror 1 is generally aligned with the direction of the straight line connecting between said pair of guide projections 11b. The support hole 12a of the holder plate 12 is fittingly inserted onto the support shafts 3, 4 projecting outwardly from the frame 11. At this time, the support hole 12a is clearance-fitted onto the support shaft 3 and the support hole 12a is fitted onto the support shaft 4 with great play allowed therebetween. In addition, the guide projections 11b projecting from the frame 11 are loosely inserted into said long holes 12b of the holder plate 12. Set screws 12h (shown in FIGS. 3 and 4) having penetrated said penetration holes 12d are screwed into the threaded apertures 11d of the frame 11, and then the holder plates 12 are temporarily attached to the frame 11 firmly just enough to prevent the long holes 12b from being released from the guide projections 11b.

The engagement adjustment plate 20 is mounted to the support shaft 3 while the notched portion 21 is being allowed to engage said engagement portion 3a. Set screws 20a (shown in FIG. 3) having penetrated the stopper long holes 23 of the engagement adjustment plate 20 are screwed into the threaded apertures 12g of the holder plate 12. Thus, the engagement adjustment plate 20 is temporarily attached to the holder plate 12. In addition, a taper pin (not shown) is inserted from the end of the support shaft 3 into said notch 3b of the support shaft 3 to increase the support shaft 3 slightly in diameter in order to prevent the engagement adjustment plate 20 from releasing from the support shaft 3. The receiver hole 31 of the operation adjustment plate 30 is fitted onto the support shaft 4 while said guide projections 32 of said operation adjustment plate 30 are being loosely fitted into said long holes 12e of the holder plate 12. Set screws 30a (shown in FIG. 4) having penetrated the stopper long holes 34 are screwed into the threaded apertures 12g. Thus, the operation adjustment plate 30 is temporarily attached to the holder plate 12. As shown in FIGS. 3 and 4, under this condition, the guide hole 11c of the frame 11 is exposed from the positioning hole 12c of the holder plate 12, while the guide hole 12f of the holder plate 12 is exposed from the long hole 22 of the engagement adjustment plate 20 and the long hole 33 of the operation adjustment plate 30.

After the cylindrical mirror 1 has been mounted to the frame 11 as described above, the position of incidence of a reflected beam of light from the cylindrical mirror 1 is adjusted. As shown in FIG. 5, under the condition $S_0$ with the cylindrical mirror 1 being temporarily mounted, an incident beam of light Li is reflected upon the reflecting surface 1a and the reflected light $Lo_0$ impinges upon a desired point T. Suppose that a desired magnification cannot be obtained at the point T under this condition. For this reason, the magnification is adjusted.

To adjust the magnification, said holder plate 12 is slid with respect to the frame 11. An adjustment tool having an eccentric pin on the tip thereof and a barrel is inserted from said positioning hole 12c to allow the eccentric pin to be loosely inserted into the guide hole 11c of the frame 11 and the barrel to be positioned inside the positioning hole 12c. Rotating the adjustment tool about the eccentric pin would cause the barrel to turn about the eccentric pin, and thereby the side of the barrel presses against the inner wall of the positioning holes 12c. This allows the holder plate 12 to slide in the direction of the straight line connecting between the guide projections 11b of the frame 11, that is, in the direction shown by the arrow P of FIGS. 1 and 2. Since the holder plate 12 is fitted on the support shaft 3, the sliding of the holder plate 12 causes the mirror holder 2 in the same direction. Referring to FIG. 5, this causes the cylindrical mirror 1 to move to a magnification position $S_1$, making it possible to obtain the desired magnification. The cylindrical mirror 1 moves in the direction of the normal of the reflecting surface 1a and in the direction of thickness of the cylindrical mirror 1. That is, the direction of the straight line connecting between said guide projections 11b is generally aligned with the direction of the normal of the reflecting surface 1a of the cylindrical mirror 1.

With the cylindrical mirror 1 having been moved to said magnification position $S_1$, the reflected light is allowed to impinge upon the point T under the predetermined magnification. Under this condition, said temporally-mounted set screws 12h are fastened to fix the holder plate 12 to the frame 11. With the cylindrical mirror 1 being positioned at the magnification position $S_1$, the reflected light is not allowed to impinge upon the point T on the reflecting surface 1a. For this reason, the orientation of the reflecting surface 1a of the cylindrical mirror 1 or the register is adjusted to allow the reflected light $Lo_0$ to impinge upon the point T.

The adjustment tool having an eccentric pin is inserted from the long hole 22 of said engagement adjustment plate 20 to allow the eccentric pin to be inserted into the guide hole 12f of the holder plate 12, and then the adjustment tool is rotated. The rotation causes the barrel of the adjustment tool to press against the inner wall of the long hole 22. Accordingly, the engagement adjustment plate 20 is allowed to rotate, in the direction shown by the arrow R of FIGS. 1 and 2, with respect to the holder plate 12 about the support shaft 3 to which the engagement adjustment plate 20 engages. The support shaft 3 engaging the engagement adjustment plate 20 is also allowed to rotate in conjunction with the rotation of the engagement adjustment plate 20. At this time, the support shaft 4 rotates with respect to the holder plate 12 and the operation adjustment plate 30. The rotation of the support shafts 3, 4 causes the mirror holder 2 to rotate. The cylindrical mirror 1 is also rotated and then positioned at the scan position $S_2$ of FIG. 5, and thereby the orientation of the reflecting surface 1a is changed. This allows the reflected light $Lo_2$ to impinge upon the point T. Under this condition, said temporally-mounted set screws 20a are screwed into the threaded apertures 12g to fix said engagement adjustment plate 20 to the holder plate 12. With a sufficiently short cylindrical mirror 1, the mounting and adjusting of the mirror would be completed when the beam of light has been introduced onto the desired point T under the desired magnification. However, with a long cylindrical mirror 1, it is necessary to adjust the reflected light, reflected successively along the longitudinal direction of the mirror, so as to draw a desired straight line or the scan line for reproduction. For example, let the desired scan line be $C_0$ as shown by a solid line in FIG. 6. In some cases, the reflected light $Lo_2$ may draw a scan line $C_1$ even when the reflected light $Lo_2$ of the cylindrical mirror 1 is incident upon the point T on the scan line $C_0$ after the aforementioned magnification and register adjustment. For this reason, the skew has to be adjusted such that the scan line $C_1$ is aligned with the scan line $C_0$.

Now, an adjustment tool having an eccentric pin is inserted from said long hole 33 of said operation adjustment plate 30 to allow the eccentric pin to be inserted into the guide hole 12f of the holder plate 12. Rotating the adjustment tool would cause the barrel thereof to rotate about the eccentric pin, allowing the side of the barrel to press against the inner wall of the long hole 33. This causes the guide projections 32 to be guided by the long holes 12e formed on the holder plate 12, thereby allowing the operation adjustment plate 30 to be slid in the longitudinal direction of the long holes 12e or in the direction shown by the arrow Q of FIGS. 1 and 2. Incidentally, the direction of the sliding is orthogonal to that of the sliding of the holder plate 12.

Figure 6:
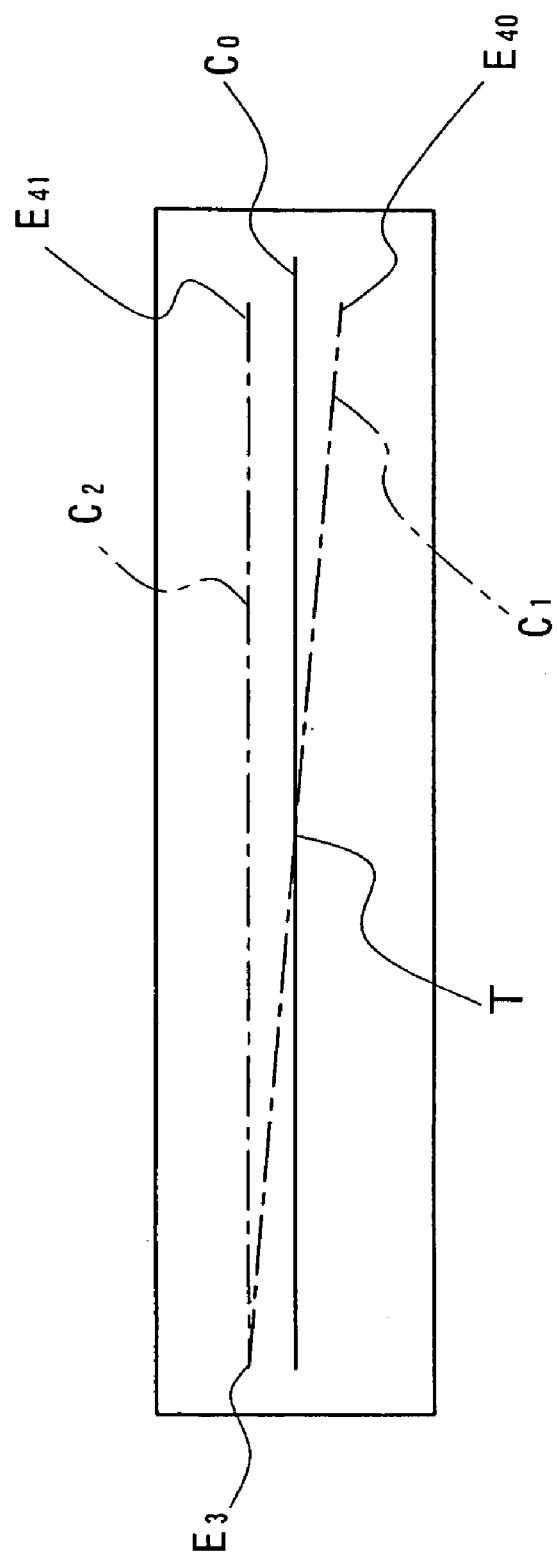
FIG. 6 is an explanatory view illustrating the procedure of adjusting scan lines.

Since the support shaft 4 is fitted into the receiver hole 31 of said operation adjustment plate 30 and moreover the support shaft 4 is adapted to penetrate the support hole 12a of the holder plate 12 to be capable of being decentered with respect thereto. Thus, the operation adjustment plate 30 slides to cause the support shaft 4 to move. This can change the relative position between the support shaft 4 and the support shaft 3. Thus, as shown in FIG. 6, it is made possible adjust the end $E_{40}$ on the side of the support shaft 4 corresponding to the scan line $C_1$ to the position $E_{41}$ relatively equal to the height of the $E_3$ on the side of the support shaft 3. This adjustment makes it possible to provide a scan line $C_2$ that is generally parallel to the scan line $C_0$. After the scan line $C_2$ has been obtained, said temporally-mounted set screws 30a are fastened to the threaded apertures 12g to fix said operation adjustment plate 30 to the holder plate 12. Then, the register is adjusted again. That is, said set screws 20a are loosened to allow the engagement adjustment plate 20 to rotate with respect to the holder plate 12. Then, as described above, the orientation of the reflecting surface 1a of the cylindrical mirror 1 can be changed to align the scan line $C_0$ with the scan line $C_0$. Subsequently, the set screws 20a are fastened again to fix the engagement adjustment plate 20 to the holder plate 12. This makes it possible to scan the reflected light $Lo_2$ of the cylindrical mirror 1 along the desired scan line $C_0$. Thus, the cylindrical mirror 1 has been completely set up and adjusted.

In the embodiment described above, said holder plate 12 is slid relative to the frame 11 for the magnification adjustment in the direction of the normal of the reflecting surface 1a of the cylindrical mirror 1. However, as shown in FIG. 5, the movement of the frame 11 in the direction of the normal causes the position of incidence relative to the cylindrical mirror 1 under the condition $S_0$ to be shifted from that under the condition $S_1$. In cases where this shift possibly causes the position of incidence to lie outside the reflecting surface 1a of the cylindrical mirror 1 upon adjustment of the register and skew in a subsequent process, it is necessary to eliminate the shift in the position of incidence. For this purpose, the cylindrical mirror 1 under the condition $S_1$ may be moved in the direction orthogonal to the normal direction of the reflecting surface 1a so as to adjust the position of incidence generally to the center of the reflecting surface 1a. In addition, since the optical path of the incident beam of light Li is specified in its design, the cylindrical mirror 1 can be moved in the direction of the incident beam of light Li, thereby making it possible to adjust the position of incidence to the center of the reflecting surface 1a. That is, the straight line connecting between the pair of guide projections 11b provided on the frame 11 in a protruding manner may be oriented generally in the direction of the incident beam of light Li. However, suppose that a plurality of cylindrical mirrors 1 are used such as in a color image forming apparatus. In this case, the mirrors may be preferably moved in the direction of the normal to perform the magnification adjustment since this allows all the cylindrical mirrors 1 to have the holder plates 12 formed in the same shape. Thus, this allows these components to be employed in common.

Furthermore, in this embodiment, such a structure has been explained that employs a band plate-like member as a cylindrical mirror. However, this structure can also be employed for mounting and adjusting a plane mirror. Incidentally, the plane mirror would not require the adjustment of the relative position between both ends for the skew adjustment. This eliminates the need for the operation adjustment plate 30 according to this embodiment, and such a structure may be employed that allows for rotatable support of the support shaft 4. Furthermore, like the structure for supporting the support shaft 3, such a structure may be employed that allows for the engagement of the engagement adjustment plate 20 instead of the operation adjustment plate 30.

In addition, in this embodiment, such a structure has been explained that allows the mirror holder 2 to house the cylindrical mirror 1. However, such a structure may be employed in which holders are each provided on both ends of the cylindrical mirror 1, and the same support shafts as said support shafts 3, 4 may be extended to the holders.

As explained above, according to the mechanism for adjustable installation of the band plate-like member, the band plate-like member is housed in a container. This prevents an adjustment force for adjusting the assembly of the band plate-like member from being applied directly to the band plate-like member. This prevents the band plate-like member from being twisted or bent, thereby causing no strain.

Furthermore, holders are adapted to house both ends of the band plate-like member, thereby preventing the components of the mechanism for adjustable installation from directly contacting with the band plate-like member. Thus, this prevents strain from being generated as much as possible in the band plate-like member.

Furthermore, said support shafts are extended in a longitudinal direction of the band plate-like member. Each of said support shaft is loosely fitted into a through hole formed on a holder plate so as to allow the support shaft to be freely decentered within the through hole. An adjustment plate is linked to a portion projecting outwardly from said holder plate of said support shaft, and said adjustment plate is moved relative to the holder plate to thereby make said support shaft movable in a direction intersecting the support shaft. In addition, said adjustment plate is rotated relative to the holder plate to thereby make said band plate-like member rotatable about the support shaft. The aforementioned adjustment plate is linked to the support shaft extended in the longitudinal direction of the band plate-like member, thereby making it possible to support the band plate-like member. Furthermore, the adjustment plate can be moved to move the support shaft and change the position of the container, while the support shaft can be rotated to change the orientation of the surface of the band plate-like member. Moreover, the force to be applied by the adjustment plate for adjustment is not applied to the band plate-like member but only to the container. Therefore, no strain will be generated in the band plate-like member.

If the band plate-like member has a plane surface such as of a plane mirror, it can be moved in the direction of thickness to adjust the optical path length, while the mirror can be moved in the direction of width to adjust the mirror such that the incident beam of light impinges positively upon the plane mirror. Furthermore, rotation of the mirror makes it possible to change the direction of the reflecting face.

If the band plate-like member has a cylindrical surface such as of a cylindrical mirror, it can be moved in the normal direction of the reflecting face thereof to change the incidence magnification of a reflected beam light, while the mirror can be moved in a direction intersecting the normal direction of the reflecting face to thereby change the relative position of the support shafts at the both ends and the direction of scan lines. Furthermore, rotation of the mirror makes it possible to change the direction of the reflecting face.

The present invention provides the mechanism for adjustable installation for adjusting the orientation of a surface of a long cylindrical mirror, the cylindrical mirror being provided on a desired frame and supported at both ends thereof. The mechanism comprises a mirror container, having at least one opening on a surface, for housing said cylindrical mirror to allow a reflecting face of the cylindrical mirror to be exposed from the opening. The mechanism also comprises support shafts extending in a longitudinal direction of the cylindrical mirror and provided on both ends of said mirror container, holder plates loosely fitted onto said respective support shafts, and an adjustment plate linked to a portion projecting outwardly from said holder plate of said support shaft. The mechanism is adapted such that said holder plate is made slidable in a direction intersecting said support shaft with respect to a surface of said frame for arranging the cylindrical mirror thereon, said adjustment plate is made slidable in a direction intersecting a sliding direction of the holder plate with respect to the holder plate, and said mirror container is made rotatable about the support shaft. This can make the direction of the movement of the cylindrical mirror caused by the movement of the holder plate different from that caused by the movement of said operation adjustment plate, allowing any one of the movements to perform the magnification adjustment and the other to perform the skew adjustment. These adjustments would not affect each other, thereby making it possible to perform the magnification adjustment and the other adjustment independently. Thus, this facilitates adjustment of the assembly.

Furthermore, the holder plate and adjustment plate can be molded of a metal sheet, thereby making it possible to provide them at a low cost, allow their mounting position to remain unchanged for a variation in temperature, and maintain the desired optical performance.

The mechanism is adapted such that any one of said holder plates is appropriately clearance-fitted onto a support shaft to serve as a restraint holder plate, and the other holder plate is appropriately loosely fitted onto a support shaft to allow the support shaft to be freely decentered and is thereby allowed to serve as a loose-fit holder plate. The mechanism is also adapted such that said adjustment plate located outside said restraint holder plate is employed as an engagement adjustment plate for engaging and disengaging the support shaft, and said engagement adjustment plate is rotated with respect to the restraint holder plate to thereby allow the mirror container to rotate about the support shaft. The mechanism is further adapted such that both of said holder plates are made slidable with respect to said frame in a normal direction of a cylindrical mirror, and said adjustment plate located outside said loose-fit holder plate is employed as an operation adjustment plate, and said operation adjustment plate is made slidable with respect to the loose-fit holder plate in a direction intersecting the normal direction of the cylindrical mirror. This allows the support shaft of the mirror container of the cylindrical mirror to move in two directions, that is, in the normal direction of the reflecting face of the cylindrical mirror and in a direction intersecting it. This makes it possible to change the magnification and the relative position between both ends to thereby perform the skew adjustment. Furthermore, the support shaft can be rotated to thereby change the orientation of the reflecting face, allowing the register adjustment to be performed. Moreover, theses adjustments can be performed independently, allowing one adjustment to be performed without affecting the other and thus facilitating the adjustments.

Furthermore, the holder plate and adjustment plate can be molded of a metal sheet, thereby making it possible to provide them at low cost, allow their mounting position to remain unchanged for a variation in temperature, and maintain the desired optical performance.

In addition, the mechanism is adapted such that any one said holder plates is appropriately clearance-fitted onto a support shaft to serve as a restraint holder plate, and the other holder plate is appropriately loosely fitted onto a support shaft to allow the support shaft to be freely decentered and is thereby allowed to serve as a loose-fit holder plate. The mechanism is also adapted such that said adjustment plate located outside said restraint holder plate is employed as an engagement adjustment plate for engaging and disengaging the support shaft, and said engagement adjustment plate is rotated with respect to the restraint holder plate to thereby allow the mirror container to rotate about the support shaft. The mechanism is further adapted such that both of said holder plates are made slidable with respect to said frame in a direction of an incident beam of light to a cylindrical mirror, said adjustment plate located outside said loose-fit holder plate is employed as an operation adjustment plate, and said operation adjustment plate is made slidable with respect to the loose-fit holder plate in a direction intersecting a normal direction of the cylindrical mirror. This allows for no variation in the position of incidence of the incident beam of light upon the cylindrical mirror even when the holder plate is moved. This makes it sure for the incident beam of light not to fall outside the reflecting face of the cylindrical mirror even when the cylindrical mirror is moved.

In addition, the mechanism is adapted such that said restraint holder plate and said loose-fit holder plate are molded in the same shape and said support shafts are provided with different outer diameters, and the support shaft for engaging and disengaging said engagement adjustment plate is provided with engagement means for preventing said engagement adjustment plate from being released. This makes it possible to form the holder plates fitting onto any support shaft in the same shape and thus uses the parts in common, thereby reducing the cost of the parts.

While there has been described what are at present considered to be preferred embodiments of the invention, it will be understood that various modifications may be made thereto, and it is intended that the appended claims cover all such modification as fall within the true spirit and scope of the invention.

What is claimed is:

1. A mechanism for adjustable installation of the surface of a band plate-like member supported at both ends thereof comprising:

a band plate-like member;

a container, said container having at least one opening on a side to allow a surface of said band plate-like member to be exposed from the opening;

a mechanism coupled to said band plate-like member for adjustment thereof; and support shafts linkable to said mechanism for adjustable installation provided on both ends of said container, wherein:

said support shafts are extended in a longitudinal direction of the band plate-like member;

each of said support shafts is loosely fitted into a through hole formed on a holder plate so as to allow the support shaft to be freely decentered within the through hole;

an adjustment plate is linked to a portion of said support shaft projecting outwardly from said holder plate; and said adjustment plate is moved relative to the holder plate in a direction intersecting the support shaft and said adjustment plate is rotated relative to the holder plate to thereby make said band plate-like member rotatable about the support shaft.

2. The mechanism for adjustable installation of the band plate-like member according to claim 1, wherein said band plate-like member has a flat surface.

3. The mechanism for adjustable installation of the band plate-like member according to claim 2, wherein said support shaft is moved to thereby make said band plate-like member movable in a direction of thickness of said band plate-like member.

4. The mechanism for adjustable installation of the band plate-like member according to claim 2, wherein said support shaft is moved to thereby make said band plate-like member movable in a direction of width of said band plate-like member.

5. The mechanism for adjustable installation of the band plate-like member according to claim 1, wherein said band plate-like member has a cylindrical surface.

6. The mechanism for adjustable installation of the band plate-like member according to claim 5, wherein said support shaft is moved to thereby make said band plate-like member movable in a direction of normal of a surface of said band plate-like member.

7. The mechanism for adjustable installation of the band plate-like member according to claim 5, wherein said support shaft is moved to thereby make said band plate-like member movable in a direction intersecting a normal of a surface of said band plate-like member.

* * * * *